United States Patent [19]

Delamare

[11] Patent Number: 4,759,573
[45] Date of Patent: Jul. 26, 1988

[54] MULTI-PASSAGE SWIVEL JOINT COMBINING FLEXIBLE AND SLIDING MEANS

[75] Inventor: Guy-Robert Delamare, Herblay, France

[73] Assignee: Technip Geoproduction

[21] Appl. No.: 776,661

[22] Filed: Sep. 16, 1985

[30] Foreign Application Priority Data

Sep. 14, 1984 [FR] France ................................ 84 14243

[51] Int. Cl.⁴ .......................................... F16L 39/00
[52] U.S. Cl. .................... 285/137.1; 285/136; 285/223
[58] Field of Search .................... 285/282, 136, 137 R, 285/137 A, 112, 131, 132, 135, 136, 137.1, 137.2, 238, 272, 223

[56] References Cited

U.S. PATENT DOCUMENTS

| | | | |
|---|---|---|---|
| 2,293,585 | 8/1942 | Bard | 285/136 |
| 2,325,464 | 7/1943 | Bannister | 285/238 |
| 2,433,588 | 12/1947 | Wreford | 285/236 |
| 2,916,816 | 12/1959 | Black et al. | 285/137.1 |
| 4,142,742 | 3/1979 | Cornett et al. | 285/136 |
| 4,250,918 | 2/1981 | Tuson et al. | 285/136 X |
| 4,280,720 | 7/1981 | Lomenech et al. | 285/136 |
| 4,558,890 | 12/1985 | Schartz | 285/136 |
| 4,602,806 | 7/1986 | Saliger | 285/136 |

FOREIGN PATENT DOCUMENTS 353120 12/1937 Italy ..................................... 285/136

Primary Examiner—Randolph A. Reese
Assistant Examiner—Anthony Knight
Attorney, Agent, or Firm—Antonelli, Terry & Wands

[57] ABSTRACT

A multi-passage swivel joint for simultaneous transfer of a plurality of separate fluids between two groups of conduits, the second group rotating about the first group has a plurality of sliding contact seals with a bundle of flow passages in deformable sheaths providing segregation continuity on the one hand for large rotations by sliding of the seals and on the other hand for small alternating angular motions by elastic deformation of at least one deformable sheath defining the flowpaths. The stiffness of the deformable sheath compared with the force required for causing the seals to slide being such that the coefficient of friction of the seals has a value such that sliding occurs before the maximum allowable deformation of the sheaths is reached.

7 Claims, 4 Drawing Sheets

MULTI-PASSAGE SWIVEL JOINT COMBINING FLEXIBLE AND SLIDING MEANS

THE BACKGROUND OF THE INVENTION

The present invention relates to a multi-passage swivel joint for the separate and simultaneous tranfer of a plurality of pressure fluids between two groups of corresponding conduits, the second group rotating about the first one.

Such a joint allows, for instance, the transfer of several different fluids under possibly different pressures between two elements of a machine subjected to relative rotation. It is particularly suited to the transfer of fluids between a marine structure used for offshore oil production from subsea wellheads and a floating facility intended for the storage and treatment of this production, such application by no means being restrictive.

The marine structure can be a mooring buoy anchored at a distance from shore. It can also be a tower or articulated column anchored on the seabed. The floating facility is usually a storage vessel or a floating plant.

The production of oil from subsea wells requires that several different fluids, for instance crude oil or gas, water, drilling mud, oil for hydrostatic systems etc... be simultaneously transferred between the floating facility and the marine structure which is connected to subsea wellheads by flexible or rigid pipes.

The floating facility subjected to wind, wave and current action must be able to weathervane around the marine structure to which it is moored.

To maintain the segregation of the various fluids to be tranferred during weathervaning, it is necessary to install a multi-passage swivel joint at the floating facility mooring point on the marine structure.

The pipes channeling the various fluids to this swivel unit can be arranged in two groups of coaxial conduits, corresponding to one another and rotatable relative to each other. They can also be arranged parallel to each other in bundles or arranged radially around the axis of rotation of the floating facility about the marine structure.

Multi-passage swivel units are already in use for the separate and simultaneous transfer of a plurality of pressure fluids between two groups of concentric conduits arranged in bundles or radially, mainly for fluid transfer between a fixed marine structure and a floating facility weathervaning around the marine structure. With such arrangements, segregation continuity during rotation is maintained by the mere sliding of the seals on their bearing area. But the statistically most frequent relative displacements, imposed to these components due to the action of sea elements on the floating facility, are small alternating angular motions usually less than $\pm 10°$.

The frequent reversals in direction of the friction torque applied on these seals make it difficult to mechanically design reliable and fatigue resistant joints. Moreover, these small motions which account for 90% of all motions cause rapid wear of the seals.

The prior art may be illustrated by the following U.S. Pat. Nos. 4,250,918; 4,183,559 and 4,099,542.

SUMMARY OF THE INVENTION

The purpose of this invention is to provide a system that requires the use of sliding contact seals only for a small part of the relative motions between both parts of the swivel system, i.e. alternating angular motions exceeding $\pm 10°$ for instance or rotations exceeding one full revolution which generally account for 10% of all motions.

To this end, the present invention proposes a multi-passage swivel unit or joint for the separate and simultaneous transfer of a plurality of fluids between two groups of corresponding conduits, the second group rotating about the first one, the unit combining, with a view to maintaining continuous segregation of the fluids during rotation, a plurality of sliding contact seals with a bundle of flowpaths in deformable sheaths, the joint providing continuous segregation, firstly for significant rotations, in particular those exceeding one turn, by the sliding of the seals and secondly, for small alternating motions, through the mere elastic deformation of at least one deformable sheath defining the flowpaths, whose stiffness is such, as compared with the force required for causing the sliding motion of seals, that the sliding threshold of the seals is not reached during these small motions.

In this multi-passage swivel joint, seals provide confinement of several coaxial annular grooves formed by the combination of at least two flanges each drilled with a plurality of ports communicating with the grooves. These ports connect each groove, firstly with the corresponding conduit in the first group and secondly with the corresponding conduit in the second group that rotates about the first group, through at least one flowpath with a deformable sheath.

The deformable sheath confining the flowpath lying along the axis of rotation of the joint can comprise at least two coaxial rigid ferrules arranged one in the extension of the other and, an outer sleeve bonded to each rigid ferrule through a ferrule made of flexible material which adheres to both the sleeve and the rigid ferrule. In that case, the torsional deformation of the sheath about the rotation axis of the joint is achieved by the shear deformation of the said flexible material proper.

Each of the flowpaths arranged as a bundle may also be confined by a deformable sheath formed of flanges with spherically shaped ends butt-jointed to each end of a rigid tube, by means of a sleeve including firstly, a rigid ferrule adhering to the tube through a flexible ferrule bonded to the rigid ferrule and to the tube and secondly, a rigid ring, whose inside cavity has a spherical shape, adhering to the flange end by means of a spherical shell, made of flexible material bonded to the flange end and to the ring. In that case, the deformation of the sheath is achieved firstly, in bending and torsion by the shear deformation of the flexible material of the shells and secondly, in elongation by the shear deformation of the flexible material of the ferrules.

Each of the flowpaths, arranged in bundles, may also be confined by a flexible sheath comprising stacked rigid and flexible flat rings, each flexible flat ring being sandwiched between two rigid flat rings to which it is bonded.

In this embodiment, the bending and torsional deformation of the wall is achieved by the shear deformation of the flexible material of the flat rings.

A plurality of flowpaths arranged in bundles can also be formed by a common flexible sheath comprising stacked rigid and flexible discs, each flexible disc being sandwiched between two rigid discs to which the flexible disc is bonded, the flowpaths crossing the stacked discs. In this arrangement, the torsional deformation of the sheath is achieved by the shear deformation of the flexible material of the discs.

Each of the flow passages arranged in bundles can also defined by a separate flexible sheath comprising a pipe made of flexible material reinforced if necesary by an internal armour.

At least one driving pin, integral in rotation, either with the flange co-acting with the seals or with the group of conduits connected to the bundle of flow passages in deformable sheaths, can be brought into contact, after a deformation with an amplitude not exceeding the maximum allowed amplitude of the sheath of the flowpaths, with at least one stop halting the pin, which is itself integral in rotation either with the group of conduits connected to the bundles of flowpaths, with deformable sheaths or with the flange co-acting with the seals, so as to directly transmit the rotational motion and cause the seals to slide.

The characteristics and advantages of this invention will be best understood from the following description of several embodiments of the invention and with reference to the accompanying drawings wherein:

DETAILED DESCRIPTION OF THE INVENTION

Figure 1:
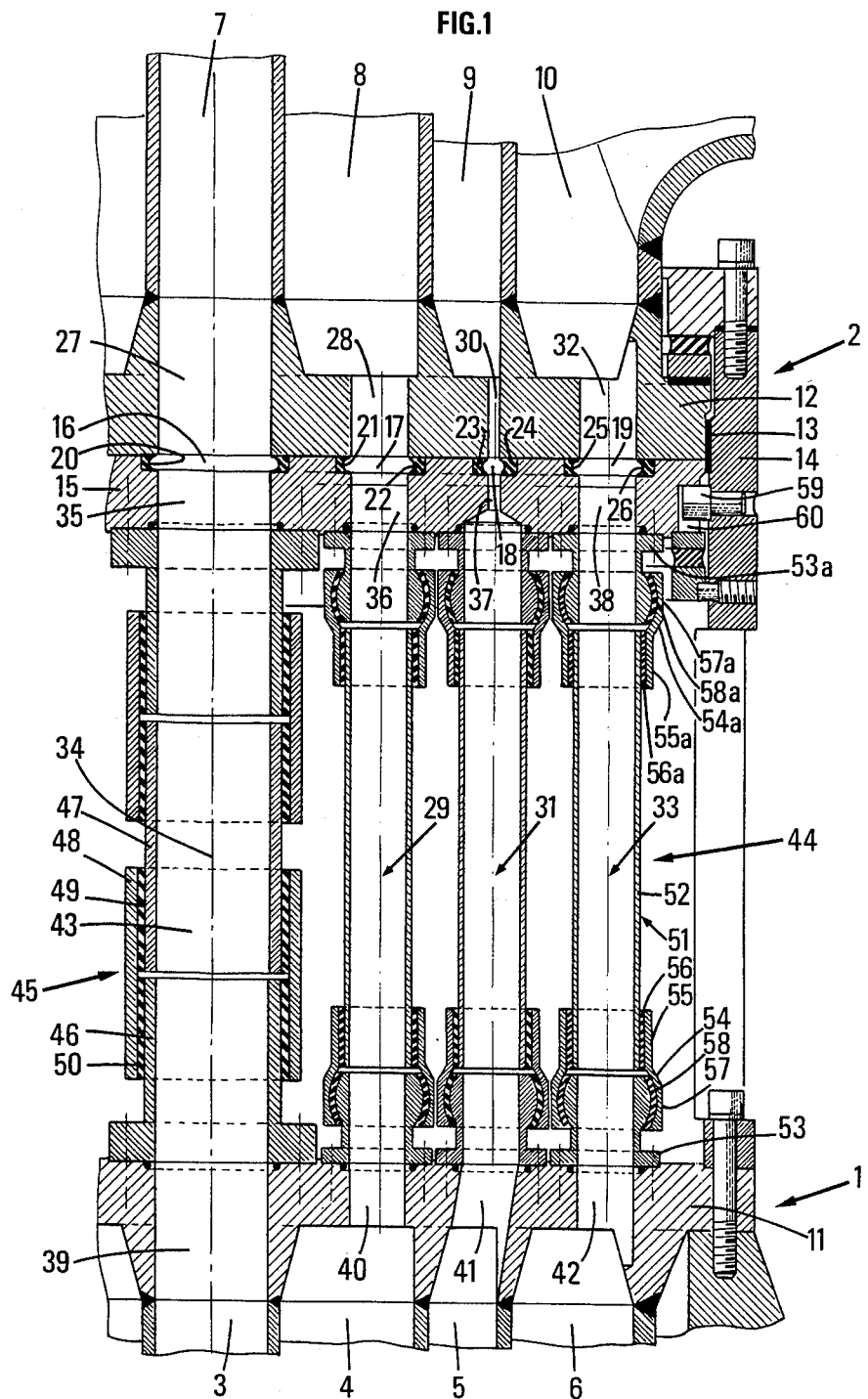
FIG. 1 is a partial sectional view across the rotation axis of a first embodiment of a swivel joint providing segregation continuity between two coaxial groups of conduits conveying fluids under pressure.

FIG. 1 shows a first embodiment of a system providing a tight seal between two coaxial groups of conduits 1 and 2, used for the transfer of four fluids under pressure. For this purpose, group 1 includes a central conduit 3 and three annular conduits 4, 5 and 6 and group 2 also includes a central conduit 6 and three annular conduits 8, 9 and 10, which correspond to the conduits of group 1, and rotate relative to them about axis 34. The conduits of group 1 are made integral with each other by means of the common flange 11 and those of group 2 by means of common flange 12. The rotation of group 2 relative to group 1, about axis 34, is mainly guided by bushing 13 on casing 14 extending to flange 11. A plate 15, also guided in its rotation around flange 11 by bushing 13, is associated with flange 12 to form a series of 4 coaxial annular grooves 16, 17, 18 and 19. Each groove is confined for lateral leaks by seals. Thus, groove 16 is confined on the outer side by seal 20, groove 17 is confined on the inner side by seal 21 and on the outer side by seal 22, groove 18 is confined on the inner side by seal 23 and on the outer side by seal 24 and groove 19 is confined on the inner side by seal 25 and outer side by seal 26. Flange 12 is drilled with a number of ports communicating with the grooves and providing connection with the corresponding conduits of group 2. Thus the central port 27 with axis 34 provides communication between the central conduit 7 and groove 16, the series of ports such as 28, drilled on a circle with diameter 29 and axis 34, provides communication between annular conduit 8 and groove 17, the series of ports such as 30, drilled on a circle with diameter 31, provides communication between annular conduit 9 and groove 18 and the series of ports such as 32, drilled on a circle with diameter 33, provides communication between annular conduit 10 and groove 19. A series of ports such as 35, 36, 37 and 38 drilled in plate 15 and 39, 40, 41 and 42 drilled in flange 11, correspond to ports such as 27, 28, 30 and 33 drilled in flange 12.

These ports provide communication between conduits 3, 4, 5 and 6 respectively of group 1 and grooves 16, 17, 18 and 19 which correspond to them through flowpaths with deformable sheaths such as 45 and 44.

Flowpath 43, centered on rotation axis 34, has a torsionally deformable sheath 45. This sheath is made by the butt-jointing of at least two coaxial rigid ferrules 46 and 47 by means of an outer sleeve 48 adhering to each of the rigid ferrules through a ferrule 49 (or 50) made of elastically deformable material bonded to the sleeve and the rigid ferrule. Torsional deformation of this sheath is achieved by the shear deformation of the flexible material of ferrules 49 and 50 which can be, for instance, an elastomer or a polyamide.

Flowpaths such as 43, arranged on a circle with diameter 29, and connecting ports such as 36 and 40, on a circle with diameter 31, and connecting ports such as 37 and 41, and on a circle with diameter 33, and connecting ports such as 38 and 42, have a sheath 51 which is deformable in bending, in torsion and in elongation. This sheath is made by butt-jointing at each end of a rigid tube 52, a flange with a spherically shaped end 53 (or 53a), by means of a sleeve 54 (or 54a), including, firstly a rigid ferrule 55 (or 55a) adhering to the rigid tube 52 through a ferrule made of elastically deformable material 56 (or 56a) bonded to the rigid ferrule 55 (or 55a) and to the rigid tube 52, and secondly, a ring 57 (or 57a) whose internal cavity has a spherical shape, and which adheres to the spherically shaped end of the flange 53 (or 53a) through a spherical shell made of flexible material 58 (or 58a) bonded to both flange end and ring 57 (or 57a).

The system also includes a driving pin 59, integral in rotation with casing 14, which is itself integral with the group of coaxial conduits 1. After a deformation with an amplitude up to the maximum allowable amplitude of the deformable sheaths of flowpaths such as 43 and 44, this driving pin is brought into contact with a stop 60 consisting of a notch in plate 15.

Figure 4:
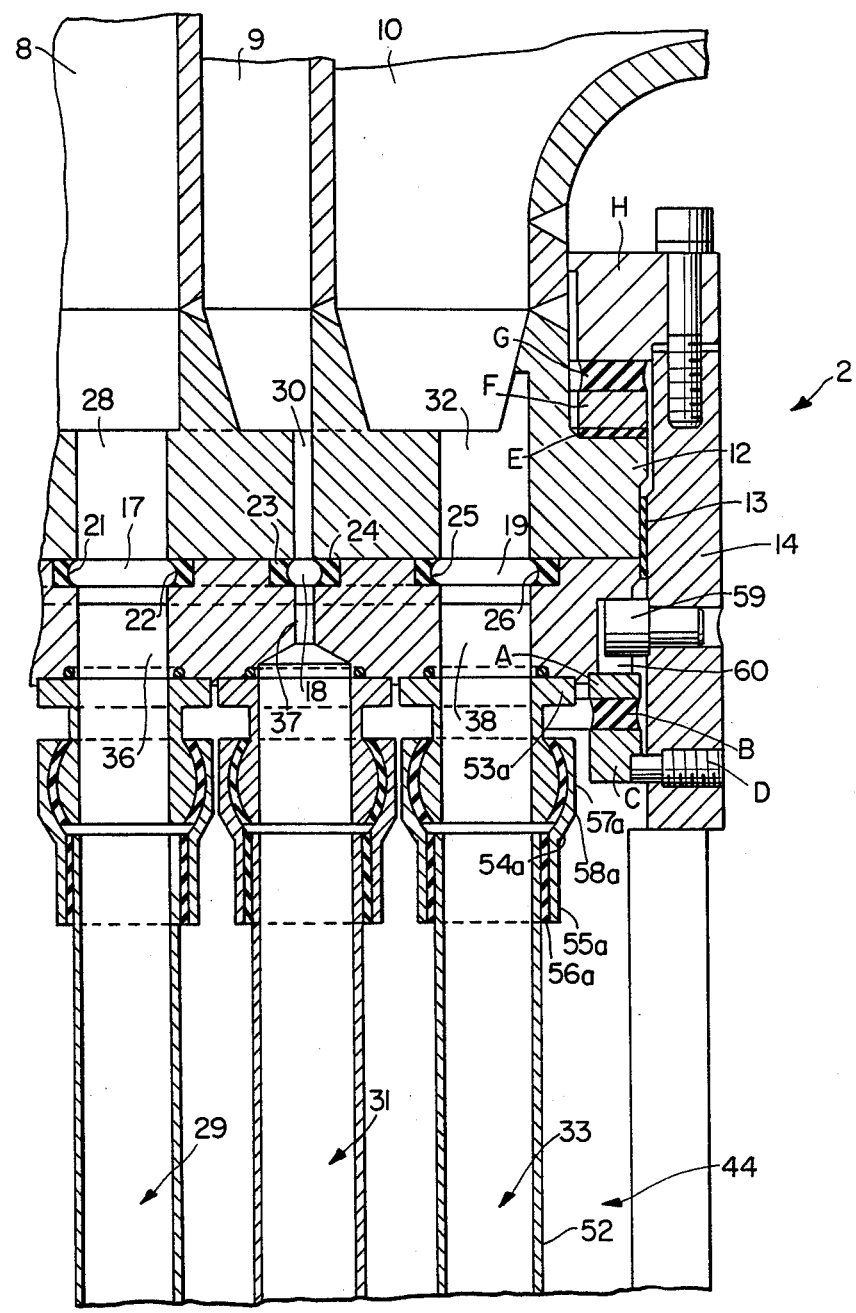
FIG. 4 is an enlarged view of the top right hand portion of FIG. 1.

FIG. 4 shows in greater detail the arrangement shown in the upper right hand portion of FIG. 1. In this figure, the relative rotation between flange 12 and plate 15 occurs, in particular, when the rotation between plate 15 and casing 14 exceeds, for example, plus or minus 10°.

First, plate 15, which serves as a support for flange 12, is supported at its lower part, at its periphery, by a first rigid ring A resting on an elastic element B, which element B rests on a second rigid ring C joined to casing 14 by a series of screws D (these retaining elements A, B, C, and D appear on the right of FIG. 1 between stop 60 and number 57a.

In addition, flange 12 is held vertically at the top by a peripheral annular bearing E surmounted by a ring F which is connected at its upper part, by an elastic element G, to a plate H screwed onto casing 14 (these retaining elements E, F, G, and H appear at the right of FIG. 1 between references 2 and 32). Elastic element G of the retaining element is designed to permit at least maximum relative rotation between plate 15 and casing 14 (for example plus or minus 10°).

Secondly, the rotation of plate 15 relative to casing 14 is limited by stop 60 integral with 15 and by pin 59 integral with 14. At the limit where stop 60 touches pin 59, no additional rotation of plate 15 can occur with respect to casing 14. The rotation between the group of coaxial conduits 1 and group of conduits 2 requires, beyond the rotation limit at which pin 59 touches stop 60, relative rotation between plate 15 and flange 12.

Casing 14 is integral with group 1 of the coaxial conduits.

Flange 12 can move relative to casing 14 by means of, on the one hand, elastic retaining element G which absorbs slight torsions, since retaining bearing E would not be fully effective by itself, and, on the other hand, by means of retaining bearing E which permits relative movement between retaining ring F and flange 12.

The operation of this first embodiment of the invention is indicated hereinafter.

When the two groups of coaxial conduits 1 and 2, which rotate about one another guided in particular by bushing 13, are only subjected to small alternating angular motions, for instance of less than ±10°, segregation continuity is achieved without any sliding of the seals 20 through 26, on their bearing surface on flange 12. On the other hand, relative motion is absorbed, in that case, by the deformation of the sheaths of flow passages such as 43 and 44. The sheath of flowpath 43 is subjected to torsional deformation about axis 34 owing to the shear flexibility of the elastically deformable ferrules such as 49 and 50.

The sheaths of flowpaths such as 44 are subjected to deformation, firstly in bending and in torsion, owing to the shear flexibility of the spherical shells made of elastically deformable material such as 58 and 58a and secondly in elongation, owing to the shear flexibility of the ferrules made of elastically deformable material such as 56 and 56a.

When the relative angular motions between the two groups of conduits 1 and 2 exceed ±10° for instance, and all the more so when rotations exceed one full revolution, free rotation is achieved by the sliding of seals 20 through 26 on their bearing surfaces on flange 12.

The coefficient of friction of the seals on their bearing surfaces is chosen at a value such, compared with the torsional stiffness of the deformable sheaths such as 43 and 44, that sliding occurs before the maximum allowable deformation amplitude for these sheaths is reached. However, for safety purposes, when the relative angular motion between 1 and 2 exceeds 10° for instance, the driving pin 59 is brought into contact with stop 60 and ensures the positive driving of plate 15 which carries seals 20 through 26, extended for this purpose by casing 14 which transmits the friction induced torque, thus protecting the deformable sheaths.

Figure 2:
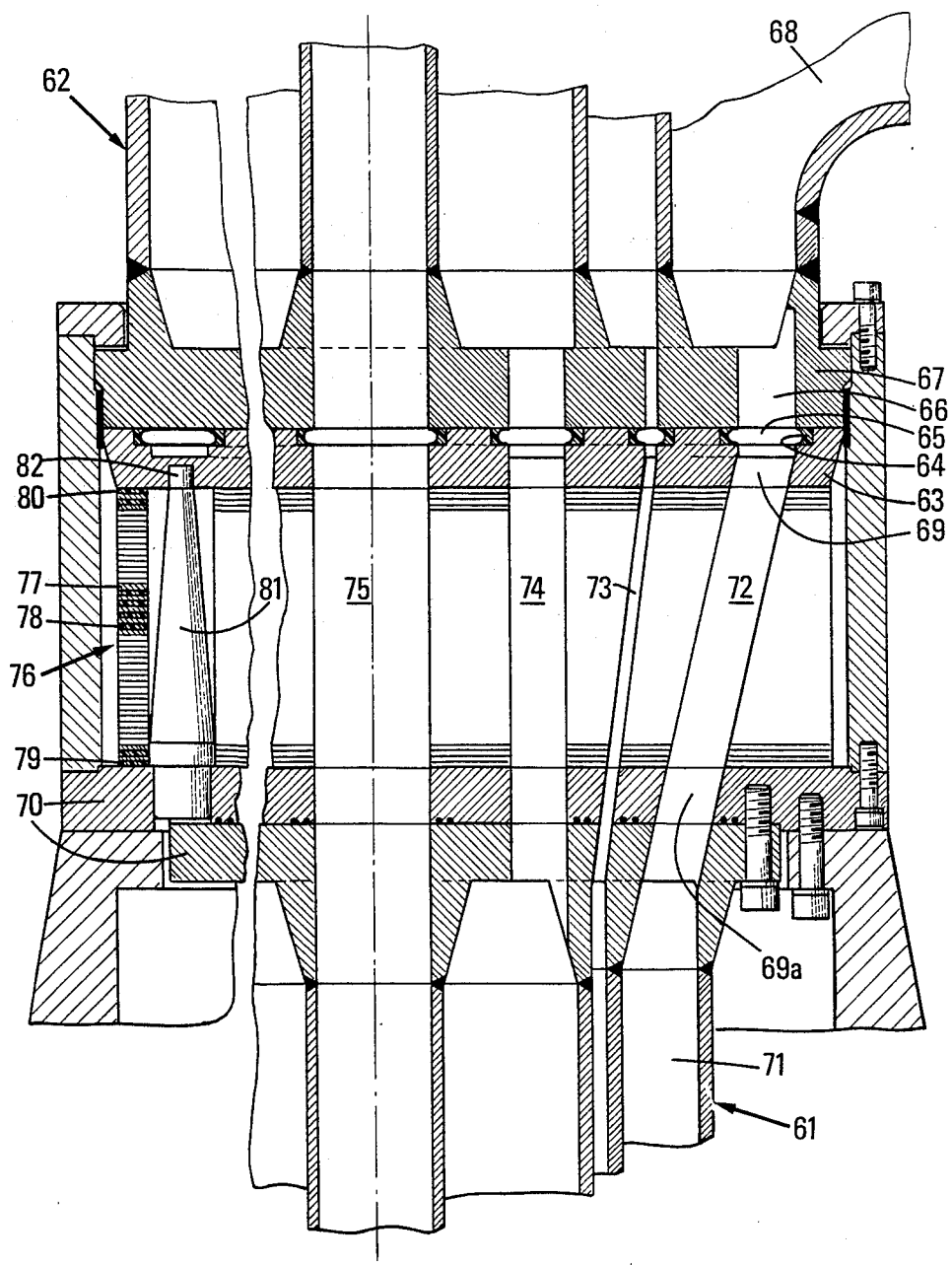
FIG. 2 is a partial sectional view across the rotation axis, of a second embodiment of a swivel joint providing segregation continuity between two coaxial groups of conduits.

FIG. 2 illustrates a second embodiment of a system providing tightness between two groups of coaxial conduits 61 and 62 rotating relative to each other and similar to conduits 1 and 2. This embodiment of the system also includes a plate 63 carrying seals such as 64 which confine concentric grooves such as 65. A number of ports such as 66, drilled in flange 67 which makes the concentric conduits of group 62 integral with each other, provide communication between those various conduits such as 68 and the grooves which correspond to them. Similarly, a number of orifices such as 69 and 69a, drilled respectively in plate 63 and in flange 70 which makes the concentric conduits of group 61 integral with each other, provide communication between said various conduits such as 71 and the grooves which correspond to them through a number of flowpaths in deformable sheaths such as 72, 73, 74 and 75.

In this embodiment of the invention the various flowpaths such as 72, 73, 74 and 75 have a common deformable sheath 76. This sheath comprises stacked rigid discs as 77 and flexible discs such as 78. Each rigid disc is sandwiched between two flexible discs 79 and 80 to which it is bonded. Also, flexible discs 79 and 80, located at each end of the stacking, are bonded to flange 70 and plate 63 respectively. The various flowpaths cross this stacking throughout to connect said ports such as 69 and 69a.

This second embodiment of the invention also includes a driving pin 81 integral in rotation with the group of conduits 61 which, after the torsional deformation of sheath 76 with an amplitude not exceeding the maximum amplitude that can be sustained without damage, is brought into contact with a stop 82 consisting of a notch in plate 63.

The operation of this second embodiment of the invention is quite similar to the operation of the first embodiment as described above. In this case, segregation continuity is also achieved for small angular motions, less than ±10° for instance, without sliding of seals such as 64, by the torsional deformation of the single sheath 76 surrounding the various flowpaths such as 72, 73, 74 and 75, which results from the shear deformation of flexible discs such as 78, pressure resistance being achieved owing to the stiffness of the discs such as 77 and tightness being achieved through the bonding, by gluing for instance, of rigid discs 77 onto flexible discs 78 which may be made for instance, of elastomer or polyamide.

Figure 3:
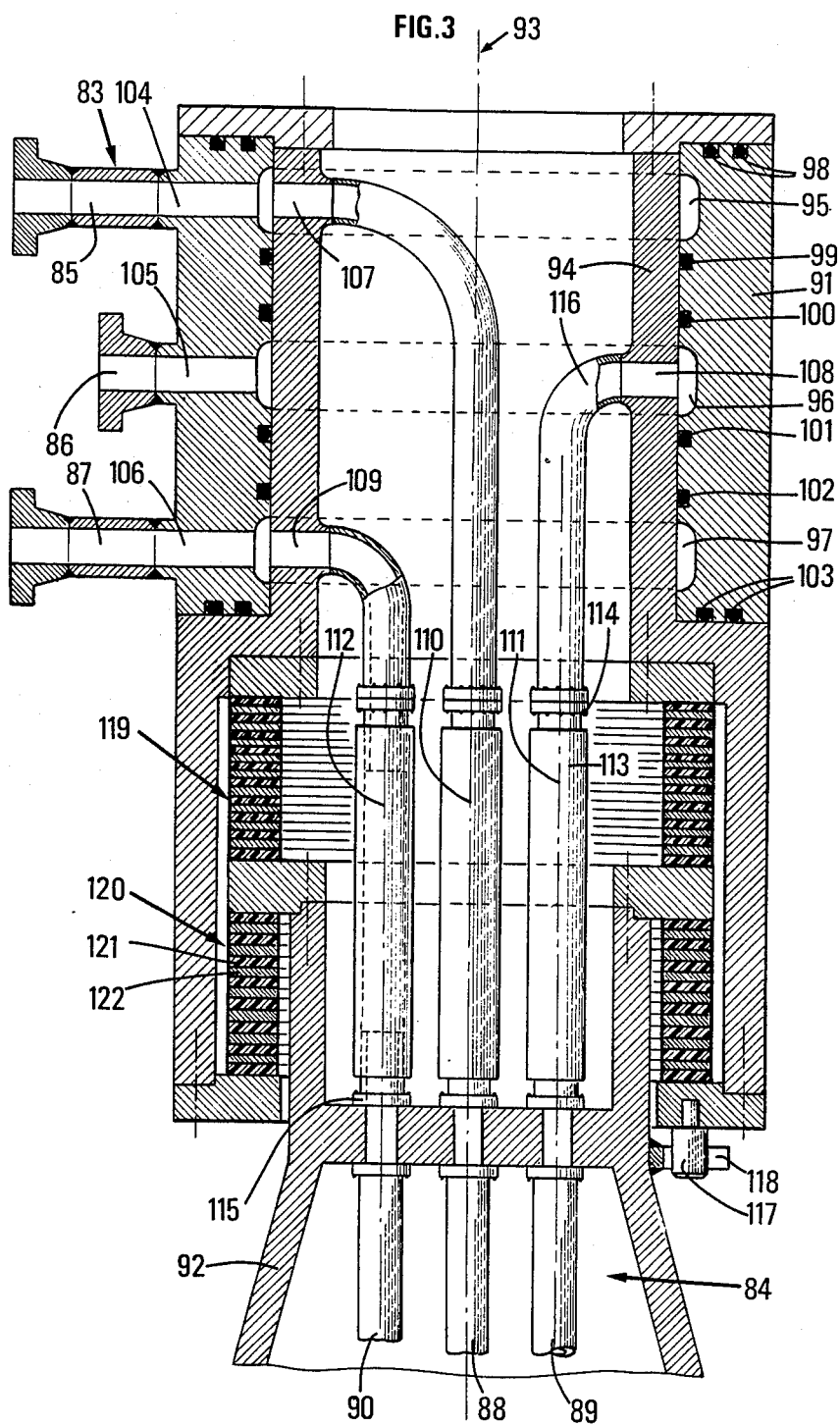
FIG. 3 is a sectional view across the rotation axis, of an embodiment of a swivel joint providing segregation continuity between a first group of conduits, arranged as bundles, and a second group of conduits, arranged radially in relation to the axis of rotation

FIG. 3 illustrates a third method of implementation of a system providing tightness between two groups of conduits 83 and 84 arranged for instance as a bundle or radially relative to the axis of rotation 93, and used for the transfer of three pressure fluids. To this effect, group 83 includes three conduits 85, 86 and 87 which correspond respectively to the three conduits 88, 89 and 90 of group 84.

The conduits of group 83, made integral with each other by flange 91, rotate around those of group 84, made integral with each other by flange 92, about axis 93. A casing 94 is associated with flange 91 to form a series of three coaxial annular grooves 95, 96 and 97. Each groove is confined by seals. Thus, groove 95 is confined by seals 98 and 99, groove 96 is confined by seals 100 and 101 groove 97 by seals 102 and 103.

Flange 91 is drilled with a multitude of ports which emerge into said grooves and provide communication between the grooves and the conduits of group 83 which correspond to them. Thus, port 104 provides communication between conduit 85 and groove 95, port 105 provides communication between conduit 86 and groove 96, and port 106 provides communication between conduit 87 and groove 97. Three ports 107, 108 and 109 are drilled in casing 94 in the same plane respectively as corresponding ports 104, 105 and 106 of flange 91. These ports provide communication between conduits 88, 89 and 90 respectively of group 84 and grooves 95, 96 and 97 via flowpaths 110, 111 and 112 which consist, on part of their length at least, of a deformable sheath. In the embodiment of the invention shown on FIG. 3, this sheath consists of a tube made of elastically deformable material such as 113 connected for instance to flange 92 and casing 94 by bolted or welded flanges such as 114, 115, 116. The elastically deformable material of the tubes, that may be for instance an elastomer or a polyamide, may be reinforced by an armour consisting for instance of resistant spiral wire.

The system also includes a driving pin 117 integral in rotation with casing 94 which is itself driven in rotation, owing to the bonding of seals 98 through 103, by flange 91 which makes the conduits of group 83 integral with each other. After deformation of the deformable sheaths of flow passages 110, 111 and 112, such as 113, with an amplitude up to the maximum allowable amplitude, the driving pin is brought into contact with a fork shaped stop 118, attached, for instance by welding, to flange 92 which makes the conduits of group 84 integral with each other.

Operation of this third embodiment of the invention is as follows: when the two groups of coaxial conduits 83 and 84 which rotate relative to each other about axis 93 are only subjected to small alternating angular motions, for instance less than ±10°, segegation continuity is achieved without any sliding of seals 98 through 103 on their bearing surface on casing 94, relative displacement in that case being taken up by the deformation of sheaths such as 113 of flow passages such as 110, 111 and 112. These sheaths owing to the shear and tensile flexibility of the material of which they are made and to the flexibility of the spiral wire armour reinforcing them, are subjected to torsional, bending and tensile deformation.

During these small motions, flange 92 can, to the best advantage, be guided in its rotation relative to casing 94 by the two elastic thrust bearings 119 and 120 which, for this purpose, are deformable in torsion about axis 93 and can transmit axial loads such as, for instance, the mass of the upper part of the swivel joint resting on flange 92 and the thrust due to internal pressure in conduits such as 110, 111 and 112. These elastic thrust bearings may, to the best advantage, comprise stacked flat rings made of elastically deformable material such as 121, and rigid flat rings, made for instance of steel, such as 122, each rigid flat ring being sandwiched between two elastically deformable flat rings, made for instance of an elastomer, to which it is bonded.

When the relative angular motions of the two groups of conduits 83 and 84 exceed ±10° for instance, and all the more so, when rotations exceed one full revolution, free rotation is achieved by the sliding of seals 98 through 103 on their bearing surface on casing 94. The coefficient of friction of these seals on the bearing surface is chosen at a value such, compared with the torsional stiffness of the deformable sheaths such as 110, 111 and 112 that sliding occurs before the maximum allowable deformable amplitude of the sheaths is reached. However for safety purposes, when the relative angular motion between 83 and 84 exceeds for instance 10°, the driving pin 117 is brought into contact with stop 118 and causes positive driving of casing 94 by the conduit group 84, which results in the sliding of casing 94 relative to flange 91, thus protecting the deformable sheaths.

Obviously, in the latter embodiment of the invention, it is possible, without exceeding the scope of the invention, to replace deformable sheaths 113 of conduits 110, 111 and 112 by deformable sheaths such as 43 and 44 illustrated on FIG. 1, or by a common sheath for the three conduits, such as sheath 76 illustrated on FIG. 2.

The advantages of this invention mainly result from the fact that it provides multi-passage swivel joints particularly suitable for the transfer of fluids between two components rotating relative to each other under the effect of sea elements, that should be able to operate for many years at sea without requiring maintenance, repair or replacement. This is made possible through the appropriate use of deformable piping elements capable of taking up the statistically most frequent (about 90%) small alternating angular motions, wihout wear or fatigue, thus confining the sliding of the seals, more likely to cause wear and fatigue, to a minimum number of rotational motions for which it is absolutely necessary.

The multi-passage swivel joint according to this invention applies to the simultaneous transfer of several fluids under pressure between two components mainly subjected to frequent small amplitude alternating motions relative to one another and to intermittent rotational motions exceeding one full revolution.

It is more particularly suitable for the transfer of fluids between a floating facility, such as a storage vessel or a floating plant, and a marine structure, such as an articulated column or an anchored buoy, to which the floating facility is moored, with a view to providing oil production facilities from an offshore field.

I claim:

1. A multi-passage swivel joint for the separate simultaneous transfer of several fluids between a first group of conduits and a second group of corresponding conduits, the second group rotating about the first group, characterized in that said joint combines, to ensure continued segregation of the fluids during rotation, a multitude of sliding contact seals and a bundle of flow passages in deformable sheaths, continuous segregation being achieved, firstly, for large rotations, in particular those exceeding one revolution, by the sliding of the seals and secondly for small alternating angular motions, by the elastic deformation of at least one deformable sheath confining said flow passages, whose stiffness is such, compared with the force required for causing said seals to slide, that the sliding threshold of the seals is not reached during said small motions.

2. A multi-passage swivel joint according to claim 1, wherein said seals are provided in annular grooves formed by the combination of at least two flanges, each drilled with several ports opening onto said grooves and initially providing a communication directly between each of said grooves and one of said conduits corresponding to it in the first group and secondly between each of said grooves and one of the said conduits corresponding to it in the second group which rotates about the first group, through at least one flow passage in a deformable sheath.

3. A multi-passage swivel joint according to claim 1 or claim 2, wherein a central deformable sheath confining the flow passage lying on the axis of rotation of the joint, comprises at least two coaxial rigid ferrules arranged one in the extension of the other, an outer sleeve bonded to each of said rigid ferrules through a flexible ferrule which adheres to the sleeve and to said rigid ferrule, the deformation of said central sheath being achieved in torsion, about the axis of said joint, by the shear deformation of flexible material of which said ferrules is made.

4. A multi-passage swivel joint according to claim 1 or claim 2 wherein each of said flow passages arranged in bundles is confined by a separate deformable sheath formed by the butt-joining, at each end of a rigid tube, of a flange with a spherically shaped end by a sleeve including, firstly a rigid ferrule bonded to said tube by a flexible ferrule adhering to said rigid ferrule and to said tube, and secondly, a rigid ring whose internal cavity has a spherical shape, this ring being bonded to said flange end by a spherical shell made of flexible material adhering to said ring, the deformation of the said sheath being achieved, firstly, in bending and in torsion by the shear deformation of flexible material of which said shells are made, and secondly, in elongation, by the shear deformation of flexible material of which said ferrules are made.

5. A multi-passage swivel joint according to claim 1 or claim 2 wherein each of said passages arranged in bundles is confined by a separate flexible sheath comprising a tube of elastically deformable material, which may be reinforced by an armour material.

6. A multi-passage swivel joint according to claim 5, wherein each of said flow passages arranged in bundles is confined by a separate flexible sheath comprising a plurality of stacked rigid and flexible flat rings, each of said flexible flat rings being sandwiched between two rigid flat rings to which the flexible flat ring is bonded, the bending and torsional deformation of said sheath being achieved by the shear deformation of flexible material of which said flat rings are made.

7. A multi-passage swivel joint according to claim 1 or claim 2 wherein a plurality of the flow passages arranged in bundles, are confined by a common deformable sheath, comprising a plurality of stacked rigid discs and flexible discs, each of said flexible discs being positioned between two rigid discs to which the flexible disc is bonded, said flow passages crossing said stacked discs and torsional deformation of said sheath being achieved by the shear deformation of flexible material of which said flexible discs are made.

* * * * *